(12) United States Patent
Nakagawa et al.

(10) Patent No.: US 11,783,592 B2
(45) Date of Patent: Oct. 10, 2023

(54) SEQUENCE RECOGNITION FROM VIDEO IMAGES

(71) Applicant: Toyota Motor Engineering & Manufacturing North America, Inc., Plano, TX (US)

(72) Inventors: Masashi Nakagawa, Sunnyvale, CA (US); Katsumi Nagata, Foster City, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 170 days.

(21) Appl. No.: 17/382,119

(22) Filed: Jul. 21, 2021

(65) Prior Publication Data
US 2023/0028769 A1   Jan. 26, 2023

(51) Int. Cl.
*G06V 20/56* (2022.01)
*G06T 7/246* (2017.01)
(Continued)

(52) U.S. Cl.
CPC .............. *G06V 20/56* (2022.01); *E05F 15/73* (2015.01); *G06T 7/248* (2017.01); *G06V 40/10* (2022.01);
(Continued)

(58) Field of Classification Search
CPC ...... G06V 20/56; G06V 40/10; G06V 10/143; G06V 20/58; G06V 20/10; G06V 40/172; G06V 10/44; G06V 10/507; G06V 20/80; G06V 40/23; G06V 40/28; G06V 10/764; G06V 10/82; G06V 20/52; G06V 20/53; G06V 40/16; G06V 40/165; G06V 40/20; E05F 15/73; E05F 2015/767; G06T 7/248; G06T 2207/30252; G06T 1/00; G06T 7/00; G06T 13/20; G06T 13/40; G06T 7/55; G06T 7/73; G06T 9/002; E05Y 2900/531; G06F 3/011; G06F 3/017; G06F 16/50; G06F 3/04842; G06F 2203/012; G06F 3/04845; G08B 21/24; G08B 21/22; G08B 13/00; G08B 15/002; G08B 19/00;
(Continued)

(56) References Cited

U.S. PATENT DOCUMENTS

2018/0208204 A1\*  7/2018  Chen ...................... G06N 20/00
2018/0307815 A1\*  10/2018  Samadani .............. G06V 40/45
(Continued)

*Primary Examiner* — Nimesh Patel
(74) *Attorney, Agent, or Firm* — SNELL & WILMER LLP (57) ABSTRACT

Methods, systems, and apparatus for an image recognition system. The image recognition system includes a memory. The memory is configured to store multiple sequences of movements of multiple standard objects. The image recognition system includes a sensor. The sensor is configured to capture image data of a surrounding environment. The image recognition system includes a processor. The processor is coupled to the memory and the sensor. The processor is configured to recognize an object in the image data. The processor is configured to determine a movement of the object based on the image data. The processor is configured to compare the movement of the object in the image data to a sequence of movements of a standard object of the plurality of standard objects, and determine that the object is a living being based on the comparison.

20 Claims, 5 Drawing Sheets

(51) Int. Cl.
*E05F 15/73* (2015.01)
*G06V 40/10* (2022.01)

(52) U.S. Cl.
CPC ... *E05F 2015/767* (2015.01); *E05Y 2900/531* (2013.01); *G06T 2207/30252* (2013.01)

(58) Field of Classification Search
CPC ........ G08B 27/003; G06N 3/045; G06N 3/08; G06N 3/004; G06N 3/008; G06N 5/022
See application file for complete search history.

(56) References Cited

U.S. PATENT DOCUMENTS

2020/0198581 A1\* 6/2020 Ette .................. B60R 25/31
2022/0207263 A1\* 6/2022 Vexler ................ G06N 20/00

\* cited by examiner

SEQUENCE RECOGNITION FROM VIDEO IMAGES

BACKGROUND

Field

The present disclosure relates to systems, apparatuses and methods for performing image recognition.

Description of the Related Art

Image recognition has a great potential for wide adoption in various industries. Image recognition deals with searching the ways to automate all the jobs that a human visual system can do. Generally, image processing consists of several stages: image import, analysis, manipulation and image output. The image processing constructs an explicit, meaningful description of physical objects from images and forms computing properties of the 3D world from one or more digital images to make useful decisions about real physical objects and scenes based on sensed images.

Generally, image recognition can be performed by using image classification. For example, given a set of images that are all labeled with a single category, the system may predict these categories for a novel set of test images and measure the accuracy of the predictions. Other forms of image recognition may use object detection. For example, the objects may be defined within the images, and so, the system applies classification and localization to many objects instead of a single dominant object. Other forms of image recognition may also include object tracking, semantic segmentation and/or instance segmentation.

These image recognition approaches often compare a reference image with a target image, or by classifying the target image into specific objects/categories. Single image processing, however, does not provide the ability to distinguish actual objects from imitation or printed/projected pictures. Living things, such as animals and humans, however, move slightly even if they are trying to keep steady.

Accordingly, there is a need for a system, an apparatus and a method for an image recognition system that distinguishes between real images and stationary images based on the changes in motion of the captured images.

SUMMARY

In general, one aspect of the subject matter described in this disclosure may be embodied in an image recognition system. The image recognition system includes a memory. The memory is configured to store multiple sequences of movements of multiple standard objects. The image recognition system incudes a sensor. The sensor is configured to capture image data of a surrounding environment. The image recognition system includes a processor. The processor is coupled to the memory and the sensor. The processor is configured to recognize an object in the image data. The processor is configured to determine a movement of the object based on the image data. The processor is configured to compare the movement of the object in the image data to a sequence of movements of a standard object of the plurality of standard object, and determine that the object is a living being based on the comparison.

These and other embodiments may optionally include one or more of the following features. The image data may include multiple images. The multiple images may include a first image captured or taken at a first time. The multiple images may include a second image captured or taken at a second time. The processor may be configured to determine that a portion of the object is in a first position in the first image and that the portion of the object is in a second position in the second image. The processor may be configured to determine a speed of a change in a position of the portion of the object based on the first position and the second position. The processor may be configured to determine a direction of the change in the position of the portion object based on the first position and the second position.

The processor may be configured to compare the speed and the direction of the change in the position of the portion of the object to a speed and a direction of a change in a position of a similar portion of the standard object. The processor may be configured to compare the object in the image data to the multiple standard objects in the memory. The processor may be configured to determine that the object matches the standard object. The processor may be configured to determine or obtain the sequence of movements of the standard object. The processor may be configured to provide an indication that the object is the living being. The processor may be configured to identify the object. The processor may be configured to provide the identification of the object to a user.

In another aspect, the subject matter may be embodied in a method of providing image recognition. The method includes storing, by a processor in a memory, multiple sequences of movements of multiple standard objects. The method includes capturing or detecting, by the processor in the memory, multiple images of a surrounding environment. The method includes recognizing, by the processor, an object in the multiple images. The method includes determining, by the processor, a first movement of the object based on the multiple images. The method includes determining, by the processor, a second movement of the object based on the multiple images. The method includes comparing, by the processor, the first and second movements of the object to a sequence of movements of a standard object of the multiple standard objects. The method includes determining, by the processor, that the object is a living being based on the comparison.

In another aspect, the subject matter may be embodied in an image recognition system for a vehicle. The image recognition system includes a memory configured to store multiple sequences of movements of multiple standard objects. The image recognition system includes a sensor configured to capture multiple images of a surrounding environment. The image recognition system includes an electronic control unit coupled to the memory and the sensor. The electronic control unit is configured to recognize an object in the multiple images. The electronic control unit is configured to determine a first movement of the object based on the multiple images. The electronic control unit is configured to determine a second movement of the object based on the multiple images. The electronic control unit is configured to compare a sequence of movements of the object to a sequence of movements of a standard object. The electronic control unit is configured to determine that the object is a living being based on the comparison.

BRIEF DESCRIPTION OF THE DRAWINGS

Other systems, methods, features, and advantages of the present invention will be apparent to one skilled in the art upon examination of the following figures and detailed description. Component parts shown in the drawings are not

DETAILED DESCRIPTION

Disclosed herein are systems, vehicles, apparatus and methods for image recognition. Particular embodiments of the subject matter described in this disclosure may be implemented to realize one or more of the following advantages. The image recognition system distinguishes actual objects from imitation or printed/projected images or pictures. The image recognition system may distinguish living beings, such as animals and humans, by their slightest movements even if the living being is attempting to remain still and steady. The image recognition system may identify the specific behavior of the living being based on the unique sequence of movements of the living being. The sequence may be eye movements, gestures, slight movement of the body, etc., and the detection may be done using an image processing algorithm or machine learning algorithm based on classification. This allows the image recognition system to identify the living being based on the movements and gestures of the living being.

Other benefits and advantages include the capability to take real-time images, display it on the screen inside the vehicle and/or identify the individual in the image based on their movements. This allows the driver to recognize the passenger during pickup. Once the image recognition system identifies the individual, the image recognition system may perform other actions in response to the identification of the individual, such as the tracking of the movement of the individual or the unlocking of the vehicle door.

Figure 1:
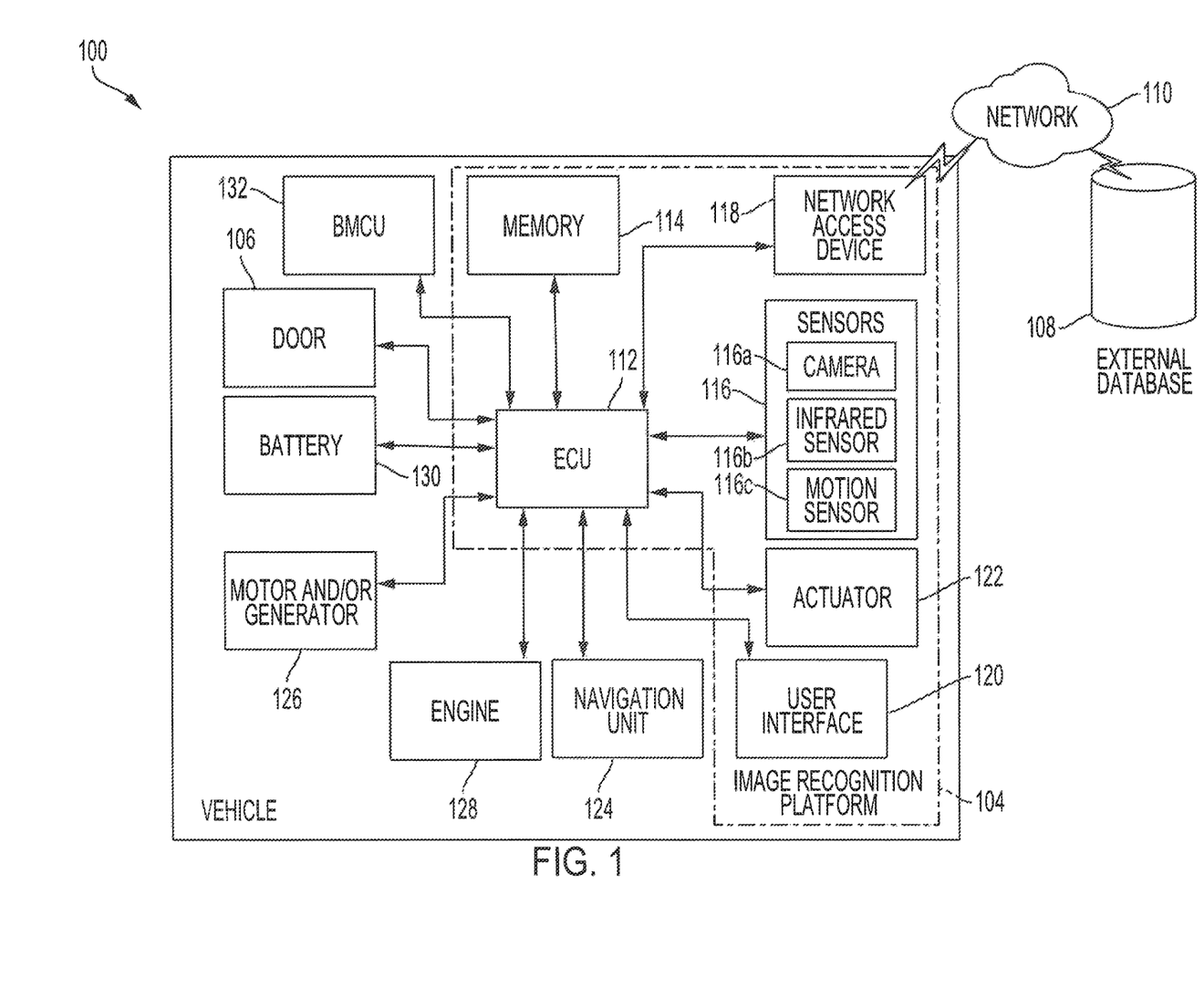
FIG. 1 is a block diagram of an example image recognition system according to an aspect of the invention.

FIG. 1 is an image recognition system 100. The image recognition system 100 may be retro-fitted, coupled to, include or be included within a vehicle 102. In some implementations, the image recognition system 100 may be included within a user device. The image recognition system 100 may couple, connect to, or include one or more other devices, such as an external database 108. The image recognition system 100 may have a network 110 that links the multiple entities to share information. For example, the network 110 may link the image recognition platform 104 with the external database 108 via the network 110. The network 110 may be a local area network (LAN), a wide area network (WAN), a cellular network, the Internet, or combination thereof, that connects, couples and/or otherwise communicates among the multiple entities wired and/or wirelessly.

The image recognition system 100 may have an image recognition platform 104 that determines whether objects within the surrounding environment are living beings. If the objects within the surrounding environment are living beings, the image recognition platform 104 may identify the living being and perform actions, such as using an actuator 122 to open a door 106 of the vehicle 102 or notify a user that there is an identified match.

The image recognition system 100 may include or be retrofitted or otherwise coupled with the vehicle 102. A vehicle 102 is a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack, a motor and/or a generator. Other examples of vehicles include bicycles, trains, planes, or boats, and any other form of conveyance that is capable of transportation. The vehicle 102 may be semi-autonomous or autonomous.

The image recognition platform 104 includes one or more processors, such as an electronic control unit (ECU) 112 and a memory 114. The image recognition system 100 may include other components, such as one or more sensors 116, a network access device 118, a user interface 120 and/or an actuator 122. The image recognition system 100 may couple, connect to, and/or include one or more other components, such as a navigation unit 124. The one or more other components may include one or more other vehicle components, such as the motor and/or generator 126, the engine 128, the battery 130, a battery management control unit (BMCU) 132 and/or a vehicle component, such as the door 106.

The image recognition platform 104 includes one or more processors, such as an electronic control unit (ECU) 112 and the memory 114. The ECU 112 may be implemented as a single ECU or as multiple ECUs. The ECU 112 may be electrically coupled to some or all of the other components within the vehicle 102, such as the motor and/or generator 126, the engine 128, the battery 130, the battery management control unit (BMCU) 132, the memory 114, the network access device 118 and/or one or more sensors 116. The ECU 112 may include one or more processors or controllers specifically designed for identifying living beings or objects in the surrounding environment and differentiating the living beings from inanimate objects in the surrounding environment. The ECU 112 may recognize the one or more objects in the surrounding environment, identify or determine whether the one or more objects in the surrounding environment are alive, identify the one or more living beings and take action to notify the user and/or actuate a components of the vehicle 102, such as open the door of the vehicle 102.

The memory 114 may be coupled to the ECU 112 and store instructions that the ECU 112 executes. The memory 114 may include one or more of a Random Access Memory (RAM) or other volatile or non-volatile memory. The memory 114 may be a non-transitory memory or a data storage device, such as a hard disk drive, a solid-state disk drive, a hybrid disk drive, or other appropriate data storage or computer readable medium, and may further store machine-readable instructions, which may be loaded and executed by the ECU 112.

The image recognition platform 104 may include a user interface 120. The image recognition platform 104 may display one or more notification on the user interface 120. The one or more notification on the user interface 120 may notify or suggest to the driver that the object is a living being and/or is a match to a desired living being. The user interface 120 may include an input/output device that receives user input, such as a user interface element, a button, a dial, a microphone, a keyboard, or a touch screen, and/or provides output, such as a display, a speaker, an audio and/or visual indicator, or a refreshable braille display. The user interface 120 may receive user input that may include configuration settings.

The image recognition system 100 may include a network access device 118. The network access device 118 may include a communication port or channel, such as one or more of a Wi-Fi unit, a Bluetooth® unit, a radio frequency identification (RFID) tag or reader, Dedicated Short-Range Communications (DSRC) or a cellular network unit for accessing a cellular network (such as 3G, 4G or 5G). The network access device 118 may transmit data to and receive data from other entities, such as the external database 108.

The image recognition system 100 may include a navigation unit 124. The navigation unit 124 may be integral to the vehicle 102 or a separate unit coupled to the vehicle 102, such as a personal device with navigation capabilities. When the navigation unit 124 is separate from the vehicle 102, the navigation unit 124 may communicate with the vehicle 102 via the network access device 118. In some implementations, the vehicle 102 may include a Global Positioning System (GPS) unit (not shown) for detecting location data and date/time information instead of the navigation unit 124. In that regard, the ECU 112 may perform the functions of the navigation unit 124 based on data received from the GPS unit. At least one of the navigation unit 124 or the ECU 112 may predict or propose a route set that includes a starting location and a destination location. The navigation unit 124 or the ECU 112 may perform navigation functions. Navigation functions may include, for example, route and route set prediction, providing navigation instructions, and receiving user input such as verification of predicted routes and route sets or destinations.

The navigation unit 124 may provide and obtain navigational map information. The navigational map information may include a current location, a starting location, a destination location and/or a route between the starting location or current location and the destination location of the vehicle 102 and may include a memory (not shown) for storing route data. The navigation unit 124 may receive data from other sensors capable of detecting data corresponding to location information. For example, the other sensors may include a gyroscope or an accelerometer.

The navigational map information may also include entity information. The entity information may include information regarding animate and/or inanimate objects that may be located in the surrounding environment at or near the current location of the vehicle 102. The entity information may have been stored in the external database 108 and may include a list of baseline or standard objects and an indication as to whether the baseline or standard objects are animate or inanimate objects. The information in the external database 108 may be updated in real-time. For example, as other vehicles and/or other image recognition systems pass by the surrounding areas of a particular location and determine the presence or lack of presence of objects and identify whether those objects are living, the other image recognition systems may pass along or provide that information to the external database 108 to update the information within the external database 108.

The image recognition system 100 may include one or more sensors 116 that capture sensor data. The one or more sensors 116 include one or more cameras 116a, one or more infrared sensors 116b and/or other sensors, such as a motion sensor 116c. The camera 116a or other imaging device may capture image data of the surrounding environment. The camera 116a may detect the image data over a period of time. For example, the camera 116a may capture a video stream or multiple images at different times. The image data may include the multiple objects in the surrounding environment of the camera 116a and the positions or locations of the multiple objects relative to each other. When the image data is captured over a period of time, the image data may include the change in the positions or locations of the multiple objects over the period of time.

The one or more sensors 116 may include one or more infrared sensors 116b. The one or more infrared sensors 116b may measure a temperature of the ambient temperature of the surrounding environment and calibrate the infrared sensor 116b based on the ambient temperature. The one or more infrared sensors 116b may then measure or detect the temperature of the one or more objects. The image recognition platform 104 may utilize the temperature difference to determine whether the one or more objects are living beings and/or to identify the one or more objects.

The one or more sensors 116 may include other sensors, such as one or more motion sensors 116c. The one or more motion sensors 116c may detect motions or movements of the one or more objects. The one or more motion sensors 116c may have a sensitivity that allows for the one or more motion sensors 116c to detect micro-gestures, such as facial movements or gestures and/or slight hand movements or muscle movements of the one or more objects. The image recognition system 100 may detect those movements and identify or determine whether the one or more objects are living beings.

The image recognition platform 104 may couple to, connect to or include the one or more actuators 122. The one or more actuators 122 may coupled to a vehicle component, such as the door 106, and control, adjust or otherwise manage a position, a setting or other aspect of the vehicle component. For example, the ECU 112 may control, adjust or otherwise manage the position or the setting of the door 106. The ECU 112 may cause the actuator 122 to unlock or lock the door 106 and/or may open or close the door 106. In another example, the ECU 112 may control, adjust or otherwise manage the position or the setting of the window, the trunk or other component of the vehicle 102, such as the engine 128.

The image recognition system 100 including the image recognition platform 104 may couple, connect to, and/or include one or more vehicle components. The one or more vehicle components may include a motor and/or generator 126. The motor and/or generator 126 may convert electrical energy into mechanical power, such as torque, and may convert mechanical power into electrical energy. The motor and/or generator 126 may be coupled to the battery 130. The motor and/or generator 126 may convert the energy from the battery 130 into mechanical power, and may provide energy back to the battery 130, for example, via regenerative braking. In some implementations, the vehicle 102 may include one or more additional power generation devices such as the engine 128 or a fuel cell stack (not shown). The engine 128 combusts fuel to provide power instead of and/or in addition to the power supplied by the motor and/or generator 126.

The battery 130 may be coupled to the motor and/or generator 126 and may provide electrical energy to and receive electrical energy from the motor and/or generator 126. The battery 130 may include one or more rechargeable batteries.

The BMCU 132 may be coupled to the battery 130 and may control and manage the charging and discharging of the battery 130. The BMCU 132, for example, may measure, using battery sensors, parameters used to determine the state of charge (SOC) of the battery 130. The BMCU 132 may control the battery 130 to maintain a reserve power explicitly for providing a sudden burst of electrical energy to be converted into power for the transmission to drive or move the multiple wheels of the vehicle 102.

The image recognition system 100 may include or be coupled to the external database 108. A database is any collection of pieces of information that is organized for search and retrieval, such as by a computer, and the database may be organized in tables, schemas, queries, reports, or any other data structures. A database may use any number of database management systems. The external database 108 may include a third-party server or website that stores or provides information. The information may include real-time information, periodically updated information, or user-inputted information. A server may be a computer in a network that is used to provide services, such as accessing files or sharing peripherals, to other computers in the network.

The external database 108 may be an image database that stores a library of standard objects that include features and motions of each of the standard objects and their corresponding sequences. The library of standard objects includes images of multiple standard objects. The multiple standard objects may include living or animate objects and/or beings and/or non-living or inanimate objects. Each of the standard objects may be associated with different movements, motions, micro-gestures or other motions and movements along with the ordering or sequence of the movements that identify the standard objects and identify the standard objects as animate or inanimate.

Figure 2:
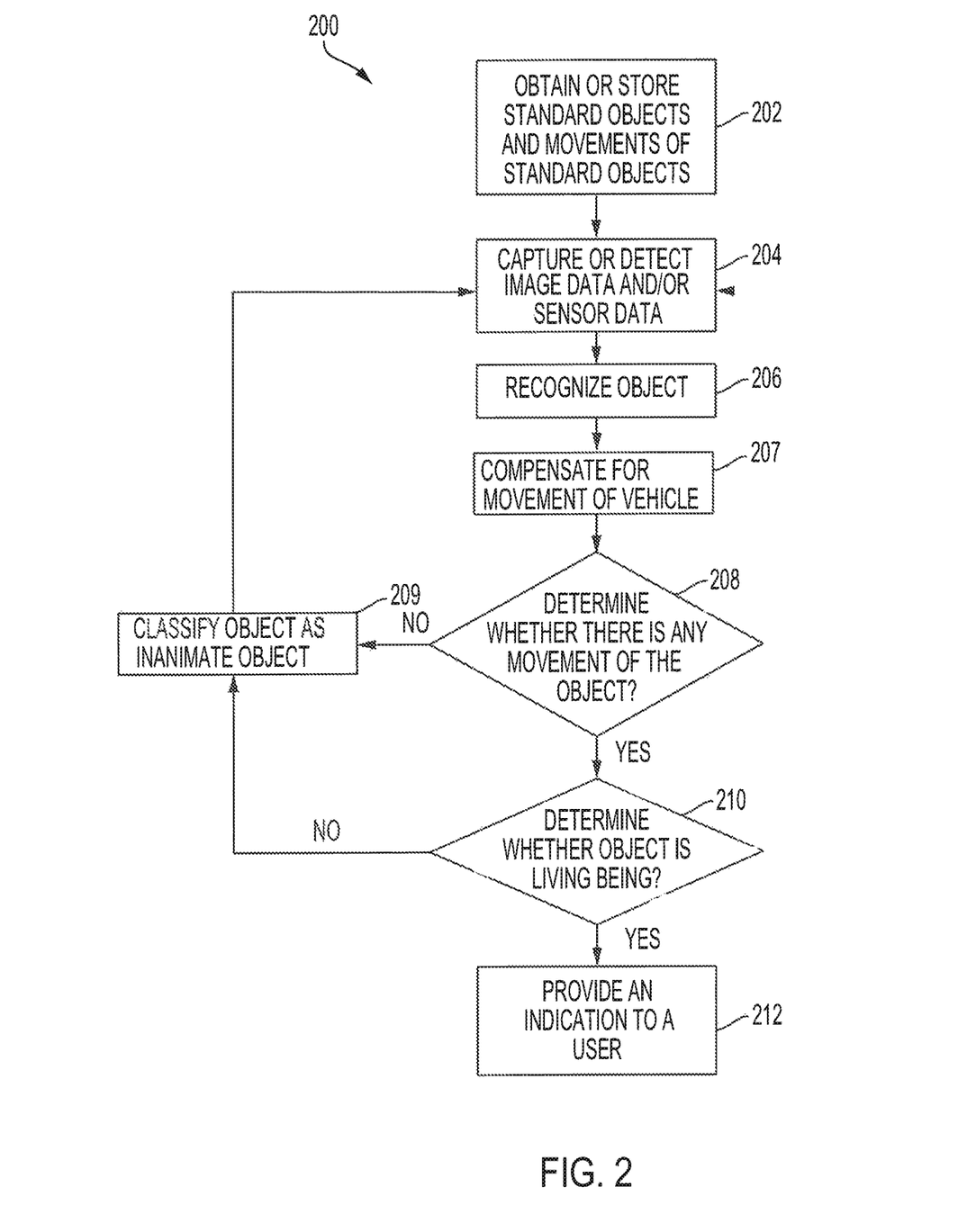
FIG. 2 is a flow diagram of an example process for identifying living beings in the surrounding environment using the image recognition system of FIG. 1 according to an aspect of the invention.

FIG. 2 is a flow diagram of an example process 200 for identifying whether an object is living being, organism or other living object. One or more computers or one or more data processing apparatuses, for example, the ECU 112 of the image recognition system 100 of FIG. 1, appropriately programmed, may implement the process 200.

The image recognition system 100 including the image recognition platform 104 may obtain, store or determine one or more standard objects and movements of the standard objects (202). The image recognition platform 104 may couple to the external database 108 that stores a library of standard objects via the network 110. The image recognition platform 104 may use the network access device 118 to connect with the external database 108 and obtain outlines or images of various standard objects within the library of standard objects and their corresponding standard movements. The standard movements may include a sequence of standard movements associated with the standard objects. A sequence of standard movements and/or a sequence of movements may include an ordering of movements of a portion of the living object, such as facial features. For example, the cheek of a face of a person may move upward at a specific speed and angle and then downward and to the left or right at a different speed and/or angle that indicates that the person is smiling. Each person may have a different direction and/or angle of the upward and downward movements and/or have a different ordering, such as an upward-left, upward-right and then downward movement, that is unique to the person and may identify the unique person or individual.

In some implementations, the image recognition platform 104 may provide the external database 108 with a current location of the vehicle 102, and in response, obtain the one or more standard objects and their corresponding movements that are specific to the current location of the vehicle 102. In some implementations, the image recognition platform 104 may determine the one or more standard objects at the current location in the surrounding environment. When the image recognition platform 104 may use the camera 116a to detect image data and when an object appears in the image data a threshold number of times the image recognition platform 104 may store the object as a standard object within the library of standard objects either within the memory 114 and/or within the external database 108.

In some implementations, the image recognition platform 104 may obtain the library of standard objects from the memory 114, which may be updated by the library of standard objects stored in the external database 108 when the image recognition platform 104 is connected to the external database 108. The library of standard objects may include the standard objects for the current location of the vehicle 102 along with their corresponding movements, motions and/or sequences of movements.

Figure 5:
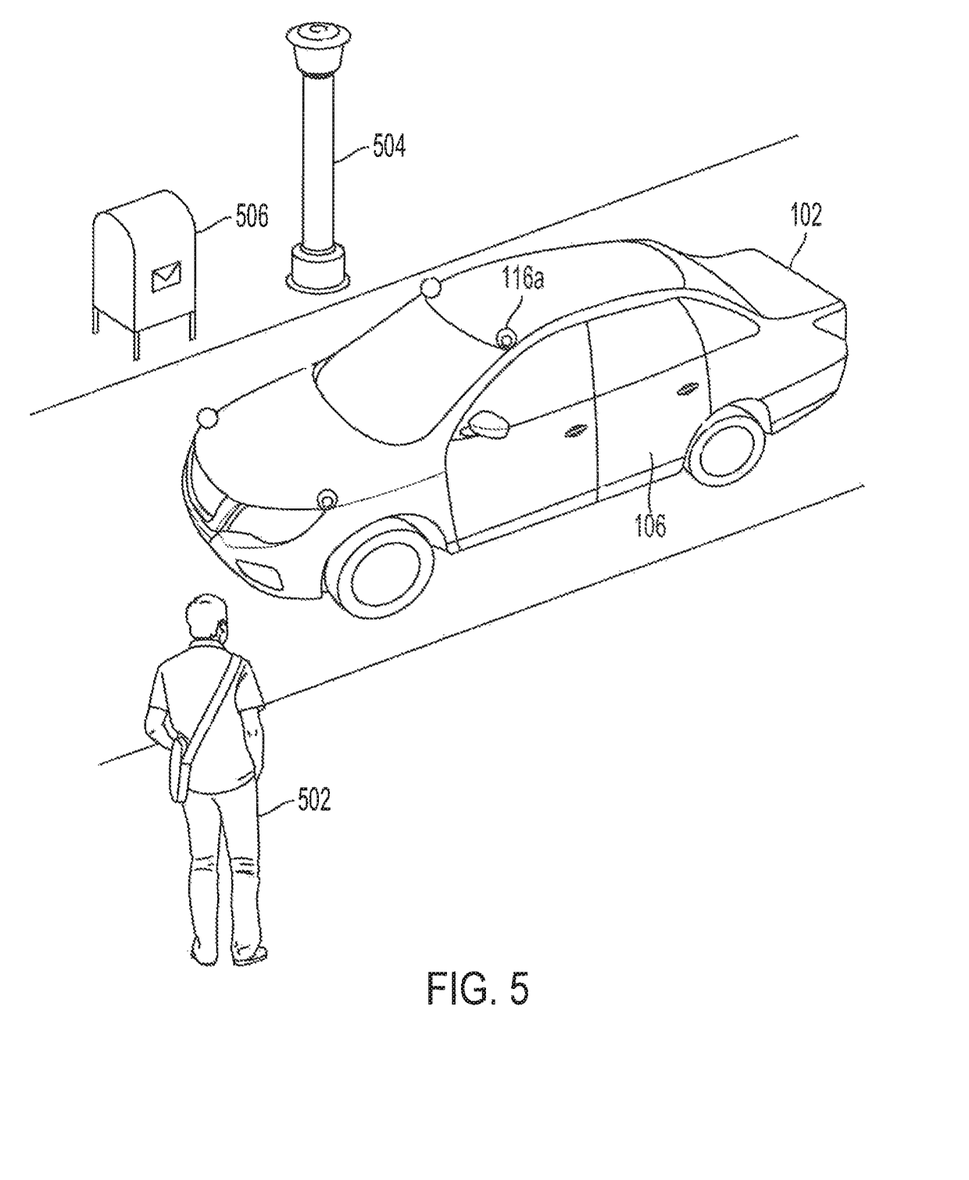
FIG. 5 shows the image recognition system of FIG. 1 identifying an individual and actuating a vehicle component according to an aspect of the invention.

The image recognition platform 104 may capture or detect image data and/or sensor data (204). The image recognition platform 104 may use one or more sensors 116, such as the camera 116a, to detect the image data. The image data may include a video stream and/or multiple images of the surrounding environment of the vehicle 102. The multiple images of the surrounding environment of the vehicle 102 may be captured or detected at different times and/or at different frequencies, such as at approximately 10 frames/seconds. For example, the camera 116a may capture a first image of the surrounding environment at a first time and a second image of the surrounding environment at a second time. The second image being different than the first image and the second time being an amount of time after or before the first time, such as during a following time period after the first time. Each image of the surrounding environment may include animate objects (or living objects, being or organisms) and inanimate objects. For example, the image recognition platform 104 may detect a person 502, a light pole 504 and/or a mailbox 506, as shown in FIG. 5, for example.

The image recognition platform 104 may obtain or detect sensor data. The image recognition platform 104 may use one or more sensors 116, such as the infrared sensor 116b or the motion sensor 116c, to detect the sensor data, such as a heat signature or movements of the object, respectively. The image data and/or sensor data may be used to determine whether the object is a living being and to identify the object.

The image recognition platform 104 may recognize one or more objects (206). The image recognition platform 104 may recognize the one or more objects based on the image data and/or the sensor data. In order to recognize the different objects within the image data, the image recognition platform 104 may segment, outline or otherwise map figures within the image data using multiple joints and segments. The segments may represent linear representations or outlines of an object and the joints may represent vertices, contours or other angles between the different segments.

Once the outline of the object is mapped, the image recognition platform 104 may compare the representation of the multiple joints and segments to standard objects within the library of standard objects, which have already been mapped, to identify the object. For example, the image recognition system 100 may compare an outline of the mailbox 506, the light pole 504, the person 502 or another animate or inanimate object to a stored outline of a mailbox, a light pole, a person and other animate and/or inanimate objects. The image recognition platform 104 may determine whether the shapes or outlines of the outlines match, and if so, the image recognition platform 104 may recognize the object as the matched object.

The image recognition platform 104 may use the sensor data to recognize the object. The image recognition platform 104 may compare the heat signature of the object with heat signatures of standard objects within the library of standard objects, and if the heat signature of the object matches one of the heat signature of a standard object within the library of standard objects, the image recognition platform 104 may associate or recognize the object with the matched object that has the same or similar heat signature. The image recognition platform 104 may compare motion or movement data that is included within the sensor data with the standard movements of the library of standard objects.

The image recognition platform 104 may compensate or normalize the image data for movement of the vehicle (207). The image recognition platform 104 may pan or move the camera 116*a* so that the object remains within the image and accounts or compensates for the movement of the vehicle 102 when determining whether there is any movement of the object. In some implementations, the image platform 104 may use algorithms to compensate or normalize for the movement of the vehicle 102 when determining whether the object has any movement. The image platform 104 may use a combination of the algorithms and/or the panning to perform the normalization.

The image recognition platform 104 may determine whether there is any movement of the object (208). The image recognition platform 104 may determine whether there is any movement of the object based on the image data and/or sensor data. Once the image recognition platform 104 segments, outlines or otherwise maps an object within the image data, the image recognition platform 104 tracks the segment or outline of the object across multiple frames of the image data taken over a period of time. The period of time in between the capture of different frames of the image data may be pre-configured or pre-set.

For example, the image recognition platform 104 may measure the distance and direction traveled by one or more points on the different segments or the outline of the object between a first image taken at a first time and a second image taken at a second time. The image recognition platform 104 measures the distance and direction across different image frames of the image data and may calculate the speed of the motion of the object based on the measured distance and the period of time in between the capture of the different frames. The image recognition platform 104 may use the relative direction that the one or more points traveled between different frames to determine the direction traveled by the object by connecting the one or more points at a first point in time to the one or more points at the second point in time, which forms a vector having both speed and direction. The calculated vector will be compared relatively with the movement of the vehicle 102 to identify if there was unexpected movement beyond a threshold made by the object. If there was unexpected movement greater than a threshold, then the object might be a living being.

The image recognition platform 104 may determine whether there is any movement based on any change in the position or location of the one or more points across the different images that may indicate the presence or lack of presence of any movement by the object. The image recognition platform 104 may also determine any movement based on motion or movement data included within the sensor data. The motion sensor 116*c* may be used to detect any movement of the object and measure any distance and/or direction of the movement of the object.

In some implementations, the image recognition platform 104 may determine whether there is any movement based on changes in the pixel between two or more images of the image data. The image recognition platform 104 may track the movement of features or portions of the living object in one pixel in a first image to another pixel in a second image to determine whether the feature or portion of the living object shown in the pixel has changed or moved.

When the image recognition platform 104 determines that the distance and/or direction traveled by one or more points is less than a threshold amount, the image recognition platform 104 may determine that there is no movement of the object. When there is no movement, the image recognition platform 104 may classify the object as an inanimate object or not living (209) and continue to monitor the image data and/or sensor data (204). When the image recognition platform 104 determines that the distance and/or direction traveled by the one or more points is greater than the threshold amount, the image recognition system 100 may proceed with determining whether the object is a living being or animate object, such as a person, an animal, a robot or other living organism, or an inanimate object that is moving, such as a ball or a vehicle.

The image recognition platform 104 may determine whether the object is a living being (210). The image recognition platform 104 may compare the movement of the object over a period of time to the standard movements of the standard object that was matched from the library of standard objects. The image recognition platform 104 may compare the sequence of movements of the object during the period of time with the sequence of movements of the standard object. For example, the sequence of movements may include moving left or right, any micro-gestures or micro-movements of the object or a portion of the object, such as an eyeball movement, a cheek area of a face of a person or a flapping of a wing of a hummingbird, and the ordering of the micro-gestures or micro-movements, such as a up and down movement of twitching in a person's face or a person's hands or a the flapping of the wing of the hummingbird.

The image recognition platform 104 may determine an initial classification of living or non-living based on the recognized object and an association in the library of standard objects. For example, each of the standard objects in the library objects may be initially classified as living or non-living and when the image recognition platform 104 recognizes the object by matching the object to a corresponding standard object the image recognition platform 104 associates the initial classification with the object. The image recognition platform 104 may also check the object using the infrared sensor 116*b* against ambient the ambient temperature. If the infrared sensor 116*b* showed different temperature measurements within the outline of the object, it could be determined as living. Then, when the image recognition platform 104 matches the movement of the object to standard movements of the standard object along with temperature measurements, the image recognition platform 104 may determine that the object is living and alive and not dead or not alive. Thus, the image recognition platform 104 may use a combination of the identification of the objects and its movements to determine whether the object is a living being. The image recognition platform 104 may also use machine learning or other algorithms to recognize, detect movement and/or determine whether the object is a living being.

Figure 3:
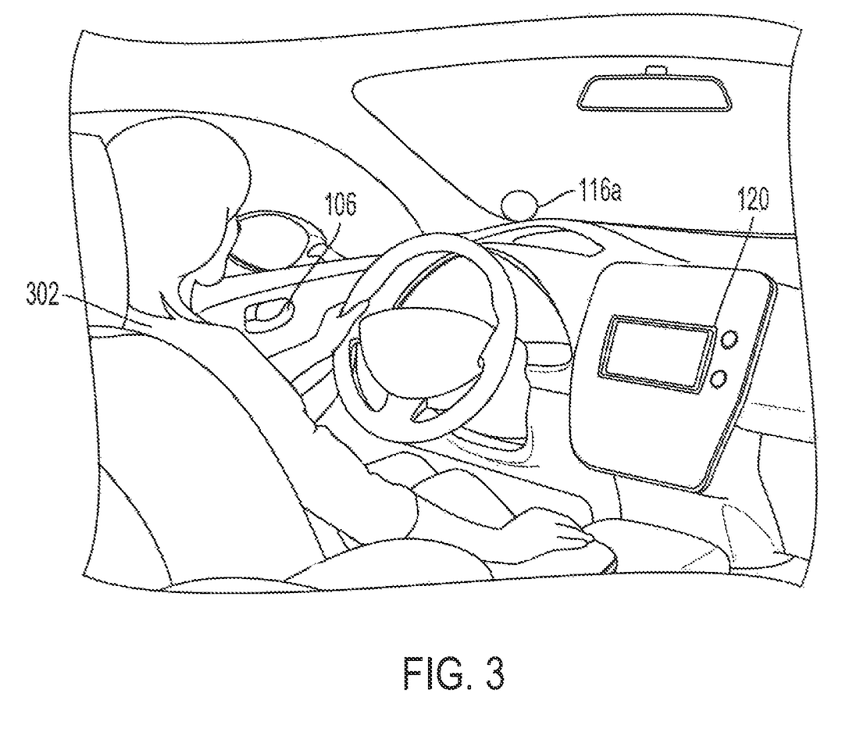
FIG. 3 shows an example display of a user interface of the image recognition system of FIG. 1 that displays notifications according to an aspect of the invention.

When the image recognition platform 104 determines that the object is not a living being, the image recognition platform 104 may classify the object as an inanimate object (209). The image recognition platform 104 may provide an indication to the user 302 on a display of the user interface 120, as shown in FIG. 3 for example, that indicates that the object is an inanimate object and is not a living being. When the image recognition platform 104 determines that the object is a living being, the image recognition platform 104 may provide an indication to a user 302 on a display of the user interface 120 that indicates that the object is an animate object and is a living being (212). The image recognition platform 104 may provide either notification using an audio and/or a visual indicator. For example, the image recognition platform 104 may display a message on the display of the user interface or output an audio indicator via a speaker or other audio component.

Figure 4:
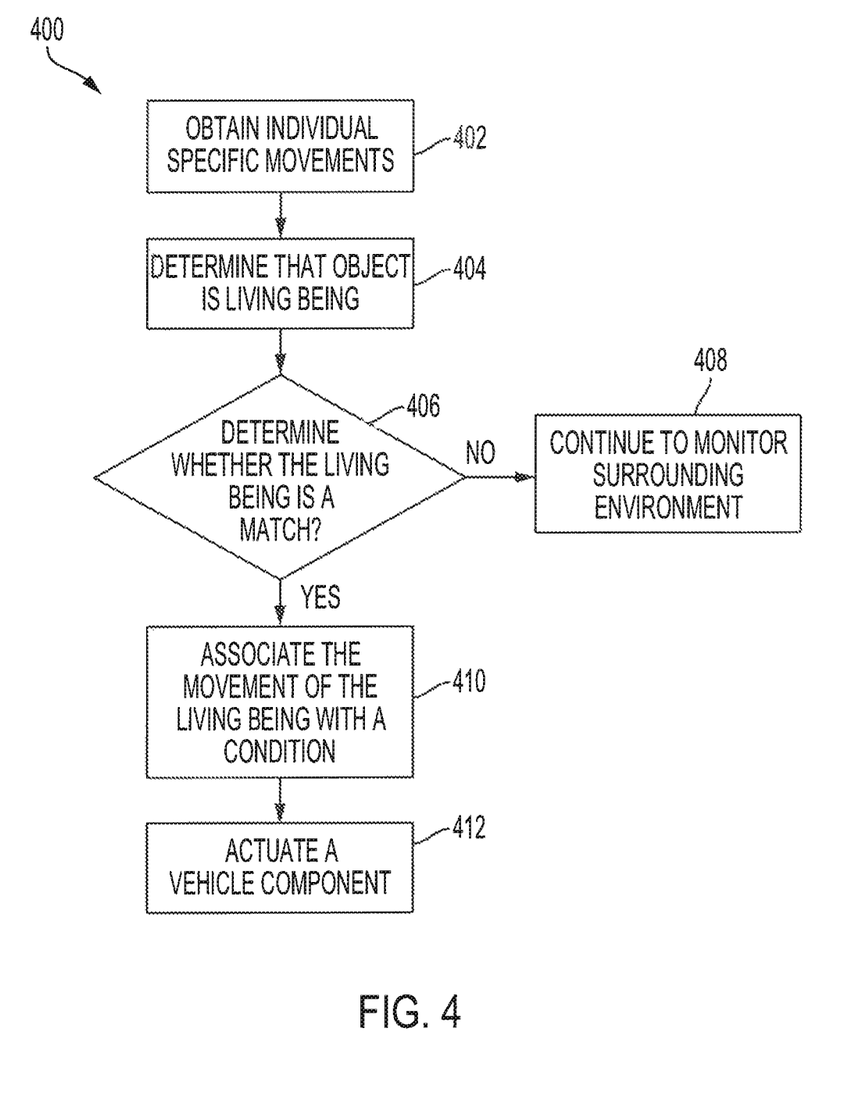
FIG. 4 is a flow diagram of an example process for actuating a vehicle component using the image recognition system of FIG. 1 according to an aspect of the invention.

FIG. 4 is a flow diagram of a process 400 for actuating a vehicle component when there is an identified match of a living being, such as a person. One or more computers or one or more data processing apparatuses, for example, the ECU 112 of the image recognition system 100 of FIG. 1, appropriately programmed, may implement the process 400.

The image recognition platform 104 determines that the object is a living being, as described above (402). Once the image recognition platform 104 determines that an object is a living being, the image recognition platform 104 may determine whether the living being is a match to a specific person or living being. Each specific person or living being may have a unique set and/or sequence of movements that identify the person or living being as a particular individual. For example, as shown in FIG. 5, the image recognition platform 104 may identify the person 502 as "John Doe."

The image recognition platform 104 may obtain specific movements of living beings or animate objects that are specific to a specific person or living being (404). For example, each person may have a unique set of movements and characteristics that are unique to the individual and may be used to identify the individual. The image recognition platform 104 may obtain a specific sequence of movements that are associated with a specific person or living being, e.g., specific movements and/or sequences of movements for "John Doe." The image recognition platform 104 may obtain the specific sequence from the external database 108 and/or the memory 114, which may have previously stored the specific sequence of movements and associated the specific sequence of movements with the specific person or living being.

The image recognition platform 104 may determine whether the living being or animate object is a match (406). The image recognition platform 104 may determine whether the living being is based on the specific movements that were obtained. The image recognition platform 104 may compare the specific movements that were obtained with the standard movements stored for the specific person or living being. When the specific movements that were obtained match the standard movements stored for the specific person or living being, the image recognition platform may determine that there is a match and that the living being is the specific person or the living being. For example, the image recognition platform 104 may personally identify that the living being is "John Doe." In order to match, the specific movements may need to be the same as the standard movements and the specific movement may need to be performed in the same order or sequence as the standard movements. The specific movements may also need to be performed with the same timing before and/or during each movement as the standard movements in order to be determined to be a match.

In some implementations, the object may be an animate object, such as a robot, instead of a living being. The image recognition platform 104 may similarly identify a specific robot or other animate object, such as a delivery robot. For example, a delivery robot could take a package out of the vehicle and then return to the vehicle without human operation, and so, the image recognition platform 104 may need to open, unlock or lock the trunk of the vehicle 102.

When the image recognition platform 104 determines that there is no match between the movement of the living being with any of the movements of the standard objects in the library of standard objects, the image recognition platform 104 may continue to monitor the surrounding environment (408). The image recognition platform 104 may provide a notification to the user 302 that there is no match. The image recognition platform 104 may continue to obtain or detect image data and/or sensor data, as described above. Otherwise, when the image recognition platform 104 determines that there is a match, the image recognition platform 104 may associate the movement of the living being with a condition (410).

The image recognition platform 104 may associate the movements of the living being or animate object with a condition (410). For example, the movements and corresponding sequence of the movements may indicate that the living being is approaching the vehicle 102, and as such, the image recognition platform 104 may perform an action in response to the sequence of movements. Different conditions may be stored and corresponded to different standard objects stored in the library of standard objects. Each condition may be associated with a sequence of standard movements. The image recognition platform 104 may match the movements of the object to a sequence of movements associated with a condition, which identifies the condition to the image recognition platform 104.

The image recognition platform 104 may actuate a vehicle component (412). The image recognition platform 104 may actuate the vehicle component based on the condition and/or on the identification of the living being. For example, if the living being is identified as "John Doe" and the sequence of movements indicate that it is "John Doe" that the user is picking up and the condition indicates that "John Doe" is moving towards the vehicle 102, the image recognition platform 104 may open, unlock or otherwise switch the door 106 into the open or unlocked position. In another example, if the living being is identifies as a different specific person and the sequence of movements indicate that it is the specific person that the user is attempting to avoid and the condition indicates that the person is moving towards the vehicle 102, the image recognition system 100 may close, lock or otherwise switch the door 106 into the closed or locked position. The image recognition platform 104 may also close or roll-up a window or other vehicle component in response to identifying the condition and/or the specific person. In another example, a delivery robot may be identified, and so, the image recognition platform 104 may need to open, unlock or lock the trunk of the vehicle 102 when the delivery robot approaches the vehicle 102 and/or leaves from the vehicle 102.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An image recognition system for identifying and allowing a living person to enter a vehicle, the image recognition system comprising:
    a memory configured to store data corresponding to a plurality of sequences of movements of a plurality of predetermined persons;
    a sensor configured to capture image data of one or more persons within a predetermined distance from a vehicle; and
    a processor coupled to the memory and the sensor and configured to:
        detect an image of a person in the image data,
        determine a movement of the person based on the image data,
        compare the movement of the person in the image data to a sequence of movements of a predetermined person of the plurality of predetermined persons by comparing a speed and a direction of a change in position of a portion of the person determined based on the image data to a speed and a direction of a change in position of a portion of the predetermined person determined based on the stored data,
        determine that the person is a living person based on the comparison,
        identify the person as an intended target to be allowed to enter the vehicle based on the image data, and
        actuate a vehicle component to allow the person to enter the vehicle based on the determination that the person is the living person and the identification of the person as the intended target to be allowed to enter the vehicle.

2. The image recognition system of claim 1, wherein the image data includes a plurality of images, wherein the plurality of images include a first image captured or taken at a first time and a second image captured or taken at a second time.

3. The image recognition system of claim 2, wherein to determine the movement of the person based on the image data the processor is configured to:
    determine that the portion of the person is in a first position in the first image and that the portion of the person is in a second position in the second image;
    determine the speed of the change in position of the portion of the person based on the first position and the second position; and
    determine the direction of the change in position of the portion of the person based on the first position and the second position.

4. The image recognition system of claim 3, wherein the portion of the person and the portion of the predetermined person have at least one shared characteristic.

5. The image recognition system of claim 1, wherein the detection of the image of the person in the image data includes:
    comparison of the image of the person in the image data to a plurality of respective images of the plurality of predetermined persons stored on the memory; and
    determination that the image of the person matches an image of the predetermined person of the plurality of predetermined persons.

6. The image recognition system of claim 5, wherein the processor is further configured to:
    determine or obtain the sequence of movements of the predetermined person.

7. The image recognition system of claim 1, wherein the processor is further configured to:
    provide an indication that the person is the living person;
    determine identifying information of the person; and
    provide the identifying information of the person to a user.

8. A method of providing image recognition for identifying and allowing a living person to enter a vehicle, the method comprising:
    storing, by a processor, data corresponding to a plurality of sequences of movements of a plurality of predetermined persons on a memory;
    capturing or detecting, by the processor, a plurality of images of one or more persons within a predetermined distance from a vehicle via a sensor;
    detecting, by the processor, an image of a person in the plurality of images;
    determining, by the processor, a first movement of the person based on the plurality of images;
    determining, by the processor, a second movement of the person based on the plurality of images;
    comparing, by the processor, a speed and a direction of movement of the person to a speed and a direction of movement of a predetermined person of the plurality of predetermined persons based on the first and the second movements of the person determined based on the plurality of images and a sequence of movements of the predetermined person determined based on the stored data;
    determining, by the processor, that the person is a living person in response to the comparing;
    identifying, by the processor, the person as an intended target to be allowed to enter the vehicle based on the plurality of images; and
    actuating, by the processor, a vehicle component to allow the person to enter the vehicle in response to determining that the person is the living person and identifying the person as the intended target to be allowed to enter the vehicle.

9. The method of claim 8, wherein the sequence of movements of the predetermined person includes two or more different movements of the predetermined person and an ordering of the two or more different movements of the predetermined person.

10. The method of claim 9, wherein comparing the speed and the direction of movement of the person to the speed and the direction of movement of the predetermined person of the plurality of predetermined persons based on the first and the second movements of the person and the sequence of movements of the predetermined person includes:
    comparing an ordering of the first and the second movements of the person to the ordering of the two or more different movements of the predetermined person.

11. The method of claim 10, further comprising:
    determining, by the processor, that the ordering of the first and the second movements of the person matches the ordering of the two or more different movements of the predetermined person;
    determining, by the processor, identifying information of the person; and providing, by the processor, the identifying information of the person to a user.

12. The method of claim 8, wherein capturing or detecting the plurality of images of the one or more persons within the predetermined distance from the vehicle includes capturing or detecting a first image at a first time, capturing or detecting a second image at a second time, and capturing or detecting a third image at a third time, wherein identifying the person as the intended target includes comparing an order of the first, the second, and the third images to the sequence of movements of the predetermined person.

13. The method of claim 8, wherein determining the first movement of the person includes:
    determining that a portion of the person is in a first position in a first image of the plurality of images and that the portion of the person is in a second position in a second image of the plurality of images;
    determining a speed of a change in position of the portion of the person based on the first position and the second position of the portion of the person; and
    determining a direction of the change in position of the portion of the person based on the first position and the second position of the portion of the person.

14. The method of claim 13, wherein comparing the speed and the direction of movement of the person to the speed and the direction of movement of the predetermined person of the plurality of predetermined persons includes:
    comparing the speed and the direction of the change in position of the portion of the person to a speed and a direction of a change in position of a portion of the predetermined person;
    wherein the portion of the person and the portion of the predetermined person have at least one shared characteristic.

15. The method of claim 8, wherein detecting the image of the person in the plurality of images includes:
    comparing the image of the person in the plurality of images to a plurality of respective images of the plurality of predetermined persons; and
    determining that the image of the person matches an image of the predetermined person of the plurality of predetermined persons.

16. An image recognition system for identifying and allowing a living person to enter a vehicle, the image recognition system comprising:
    a memory configured to store data corresponding to a plurality of sequences of movements of a plurality of predetermined persons;
    a sensor configured to capture sensor data including a plurality of images of one or more persons within a predetermined distance from a vehicle; and
    an electronic control unit (ECU) having a processor and being coupled to the memory and the sensor and configured to:
        detect an image of a person in the plurality of images,
        determine a first movement of the person based on the plurality of images,
        determine a second movement of the person based on the plurality of images,
        compare a speed and a direction of movement of the person to a speed and a direction of movement of a predetermined person of the plurality of predetermined persons based on the first and the second movements of the person determined based on the plurality of images and a sequence of movements of the predetermined person determined based on the stored data,
        determine that the person is a living person based on the comparison,
        identify the person as an intended target to be allowed to enter the vehicle based on the plurality of images, and
        actuate a vehicle component to allow the person to enter the vehicle based on the determination that the person is the living person and the identification of the person as the intended target to be allowed to enter the vehicle.

17. The image recognition system of claim 16, wherein the ECU is further configured to:
    capture a first image of the plurality of images at a first time; and
    capture a second image of the plurality of images at a second time.

18. The image recognition system of claim 16, wherein the detection of the image of the person in the plurality of images includes:
    comparison of the image of the person in the plurality of images to a plurality of respective images of the plurality of predetermined persons stored on the memory; and
    determination that the image of the person includes an image of the predetermined person based on the comparison.

19. The image recognition system of claim 16, wherein the ECU is further configured to:
    determine or obtain the sequence of movements of the predetermined person; and
    compare the first and the second movements of the person to the sequence of movements of the predetermined person.

20. The image recognition system of claim 16, wherein to actuate the vehicle component to allow the person to enter the vehicle the ECU is configured to:
    open a door on the vehicle.

* * * * *